United States Patent
Liao

(10) Patent No.: US 7,126,615 B2
(45) Date of Patent: Oct. 24, 2006

(54) COLOR COMPRESSION USING MULTIPLE PLANES IN A MULTI-SAMPLE ANTI-ALIASING SCHEME

(75) Inventor: Fred Liao, San Jose, CA (US)

(73) Assignee: VIA Technologies, Inc., Taipei (TW)

( * ) Notice: Subject to any disclaimer, the term of this patent is extended or adjusted under 35 U.S.C. 154(b) by 120 days.

(21) Appl. No.: 10/987,071

(22) Filed: Nov. 12, 2004

(65) Prior Publication Data

US 2006/0103658 A1    May 18, 2006

(51) Int. Cl.
*G09G 5/00* (2006.01)

(52) U.S. Cl. .................. 345/613; 345/612; 345/611; 345/614

(58) Field of Classification Search ............. None
See application file for complete search history.

(56) References Cited

U.S. PATENT DOCUMENTS

| 6,714,196 B1* | 3/2004 | McCormack et al. ....... 345/423 |
| 2001/0019331 A1* | 9/2001 | Nielsen et al. ............. 345/542 |
| 2004/0161146 A1* | 8/2004 | Van Hook et al. .......... 382/166 |

* cited by examiner

*Primary Examiner*—Mark Zimmerman
*Assistant Examiner*—Kevin Xu
(74) *Attorney, Agent, or Firm*—Thomas, Kayden, Horstemeyer & Risley

(57) ABSTRACT

Systems and methods are provided for compressing computer graphics color data in a system utilizing a multi-sample anti-aliasing scheme using multiple planes for storing color data samples. Each of the planes is configured as a block of contiguous memory.

19 Claims, 11 Drawing Sheets

COLOR COMPRESSION USING MULTIPLE PLANES IN A MULTI-SAMPLE ANTI-ALIASING SCHEME

TECHNICAL FIELD

The present invention generally relates to graphics systems, and more particularly, to color compression using multiple planes in a multi-sample anti-aliasing scheme.

BACKGROUND OF THE INVENTION

As is known, the art and science of three-dimensional ("3-D") computer graphics concerns the generation, or rendering of two-dimensional ("2-D") images of 3-D objects for display or presentation onto a display device or monitor, such as a Cathode Ray Tube (CRT) or a Liquid Crystal Display (LCD). The object may be a simple geometry primitive such as a point, a line segment, a triangle, or a polygon. More complex objects can be rendered onto a display device by representing the objects with a series of connected planar polygons, such as, for example, by representing the objects as a series of connected planar triangles. All geometry primitives may eventually be described in terms of one vertex or a set of vertices, for example, coordinate (x, y, z) that defines a point, for example, the endpoint of a line segment, or a corner of a polygon.

To generate a data set for display as a 2-D projection representative of a 3-D primitive onto a computer monitor or other display device, the vertices of the primitive are processed through a series of operations, or processing stages in a graphics-rendering pipeline. A generic pipeline is merely a series of cascading processing units, or stages, wherein the output from a prior stage serves as the input for a subsequent stage. In the context of a graphics processor, these stages include, for example, per-vertex operations, primitive assembly operations, pixel operations, texture assembly operations, rasterization operations, and fragment operations.

In a typical graphics display system, an image database (e.g., a command list) may store a description of the objects in the scene. The objects are described with a number of small polygons, which cover the surface of the object in the same manner that a number of small tiles can cover a wall or other surface. Each polygon is described as a list of vertex coordinates (X, Y, Z in "Model" coordinates) and some specification of material surface properties (i.e., color, texture, shininess, etc.), as well as possibly the normal vectors to the surface at each vertex. For three-dimensional objects with complex curved surfaces, the polygons in general must be triangles or quadrilaterals, and the latter can always be decomposed into pairs of triangles.

A transformation engine transforms the object coordinates in response to the angle of viewing selected by a user from user input. In addition, the user may specify the field of view, the size of the image to be produced, and the back end of the viewing volume so as to include or eliminate background as desired.

Once this viewing area has been selected, clipping logic eliminates the polygons (i.e., triangles) which are outside the viewing area and "clips" the polygons, which are partly inside and partly outside the viewing area. These clipped polygons will correspond to the portion of the polygon inside the viewing area with new edge(s) corresponding to the edge(s) of the viewing area. The polygon vertices are then transmitted to the next stage in coordinates corresponding to the viewing screen (in X, Y coordinates) with an associated depth for each vertex (the Z coordinate). In a typical system, the lighting model is next applied taking into account the light sources. The polygons with their color values are then transmitted to a rasterizer.

For each polygon, the rasterizer determines which pixel positions are covered by the polygon and attempts to write the associated color values and depth (Z value) into a frame buffer. The rasterizer compares the depth values (Z) for the polygon being processed with the depth value of a pixel, which may already be written into the frame buffer. If the depth value of the new polygon pixel is smaller, indicating that it is in front of the polygon already written into the frame buffer, then its value will replace the value in the frame buffer because the new polygon will obscure the polygon previously processed and written into the frame buffer. This process is repeated until all of the polygons have been rasterized. At that point, a video controller displays the contents of a frame buffer on a display one scan line at a time in raster order.

The default methods of performing real-time rendering typically display polygons as pixels located either inside or outside the polygon. The resulting edges which, define the polygon, can appear with a jagged look in a static display and a crawling look in an animated display. The underlying problem producing this effect is called aliasing and the methods applied to reduce or eliminate the problem are called anti-aliasing techniques.

Screen-based anti-aliasing methods do not require knowledge of the objects being rendered because they use only the pipeline output samples. One typical anti-aliasing method utilizes a line anti-aliasing technique called Multi-Sample Anti-Aliasing (MSAA), which takes more than one sample per pixel in a single pass. The number of samples or sub-pixels taken for each pixel is called the sampling rate and, axiomatically, as the sampling rate increases, the associated memory traffic also increases.

With this general background provided, reference is now made to FIG. 1, which shows a functional flow diagram of certain components within a graphics pipeline in a computer graphics system. It will be appreciated that components within graphics pipelines may vary from system to system, and may also be illustrated in a variety of ways. As is known, a host computer 10 (or a graphics API running on a host computer) may generate a command list 12, which comprises a series of graphics commands and data for rendering an "environment" on a graphics display. Components within the graphics pipeline may operate on the data and commands within the command list 12 to render a screen in a graphics display.

In this regard, a parser 14 may retrieve data from the command list 12 and "parse" through the data to interpret commands and pass data defining graphics primitives along (or into) the graphics pipeline. In this regard, graphic primitives may be defined by location data (e.g., x, y, z, and w coordinates) as well as lighting and texture information. All of this information, for each primitive, may be retrieved by the parser 14 from the command list 12, and passed to a vertex shader 16. As is known, the vertex shader 16 may perform various transformations on the graphics data received from the command list. In this regard, the data may be transformed from World coordinates into Model View coordinates, then into Projection coordinates, and ultimately into Screen coordinates. The functional processing performed by the vertex shader 16 is known and need not be described further herein. Thereafter, the graphics data may be passed onto rasterizer 18.

Thereafter, a z-test 20 is performed on each pixel within the primitive. As is known, this z-test is performed by comparing a current z-value (i.e., a z-value for a given pixel of the current primitive) in comparison with a stored z-value for the corresponding pixel location. The stored z-value provides the depth value for a previously rendered primitive for a given pixel location. If the current z-value indicates a depth that is closer to the viewer's eye than the stored z-value, then the current z-value will replace the stored z-value and the current graphic information (i.e., color) will replace the color information in the corresponding frame buffer pixel location (as determined by the pixel shader 22). If the current z-value is not closer to the current viewpoint than the stored z-value, then neither the frame buffer nor z-buffer contents need to be replaced, as a previously rendered pixel will be deemed to be in front of the current pixel.

Again, for pixels within primitives that are rendered and determined to be closer to the viewpoint than previously-stored pixels, information relating to the primitive is passed on to the pixel shader 22 which determines color information for each of the pixels within the primitive that are determined to be closer to the current viewpoint. Once color information is computed by the pixel shader 22, the information is stored within the frame buffer 24.

Although the foregoing has only briefly summarized the operation of the various processing components, persons skilled in the art will recognize that the processing on graphics data is quite intense. Consequently, it is desired to improve processing efficiency wherever possible.

SUMMARY OF THE INVENTION

Embodiments of the present invention provide a system for compressing color data in a computer graphics system, comprising: a graphics processing unit (GPU); a frame buffer, in communication with the GPU, adapted to maintain color data for a pixel; a plurality of sub-pixels, such that each of the plurality of sub-pixels comprises a color sample for the pixel; a sampling rate, wherein the sampling rate comprises the number of sub-pixels per pixel and wherein the sampling rate is predetermined; a tile, wherein the tile comprises a plurality of pixels; and a plurality of planes adapted to store the plurality of color samples, wherein a sampling rate equals the number of planes.

Briefly described, one embodiment of the system, among others, can be implemented as computer graphics hardware, comprising a means for compressing color data using a plurality of designated planes to store sub-pixel color sample data.

Embodiments of the present invention can also be viewed as providing methods for compressing color data in a computer graphics system. In this regard, one embodiment of such a method, among others, can be broadly summarized by the following steps: storing pixel color data in a frame buffer; establishing a sampling rate, for determining the number of color samples per pixel; allocating a plurality of color samples to each pixel, wherein each of the plurality of color samples comprises a sub-pixel, such that each pixel comprises a plurality of sub-pixels; generating a tile, such that the tile comprises a plurality of pixels; organizing memory into a plurality of planes adapted to store the plurality of sub-pixels, wherein each of the plurality of sub-pixels associated with the pixel comprises a different one of the plurality of planes, and wherein each of the plurality of planes comprises contiguous memory; and accessing a tile record, such that the tile record comprises tile compression data.

Embodiments of the present invention can also be viewed as providing a computer graphics system comprising: multi-sample anti-aliasing logic configured to store a plurality of color samples for each pixel, wherein each color sample comprises a sub-pixel, such that the color data for each pixel comprises a plurality of sub-pixels, and wherein a tile comprises a plurality of pixels; color data compression logic configured to designate a plurality of planes, wherein each of the plurality of planes is designated for a different one of the plurality of sub-pixels, and wherein the each of the plurality of planes comprises a block of contiguous memory; and tile compression status logic configured to determine the compressibility of a tile, wherein a tile record comprises tile fully covered data to indicate when all pixels in the tile are fully covered, wherein if the tile is fully covered tile color data is stored in a first plane of the plurality of planes.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE PREFERRED EMBODIMENT

Figure 1:
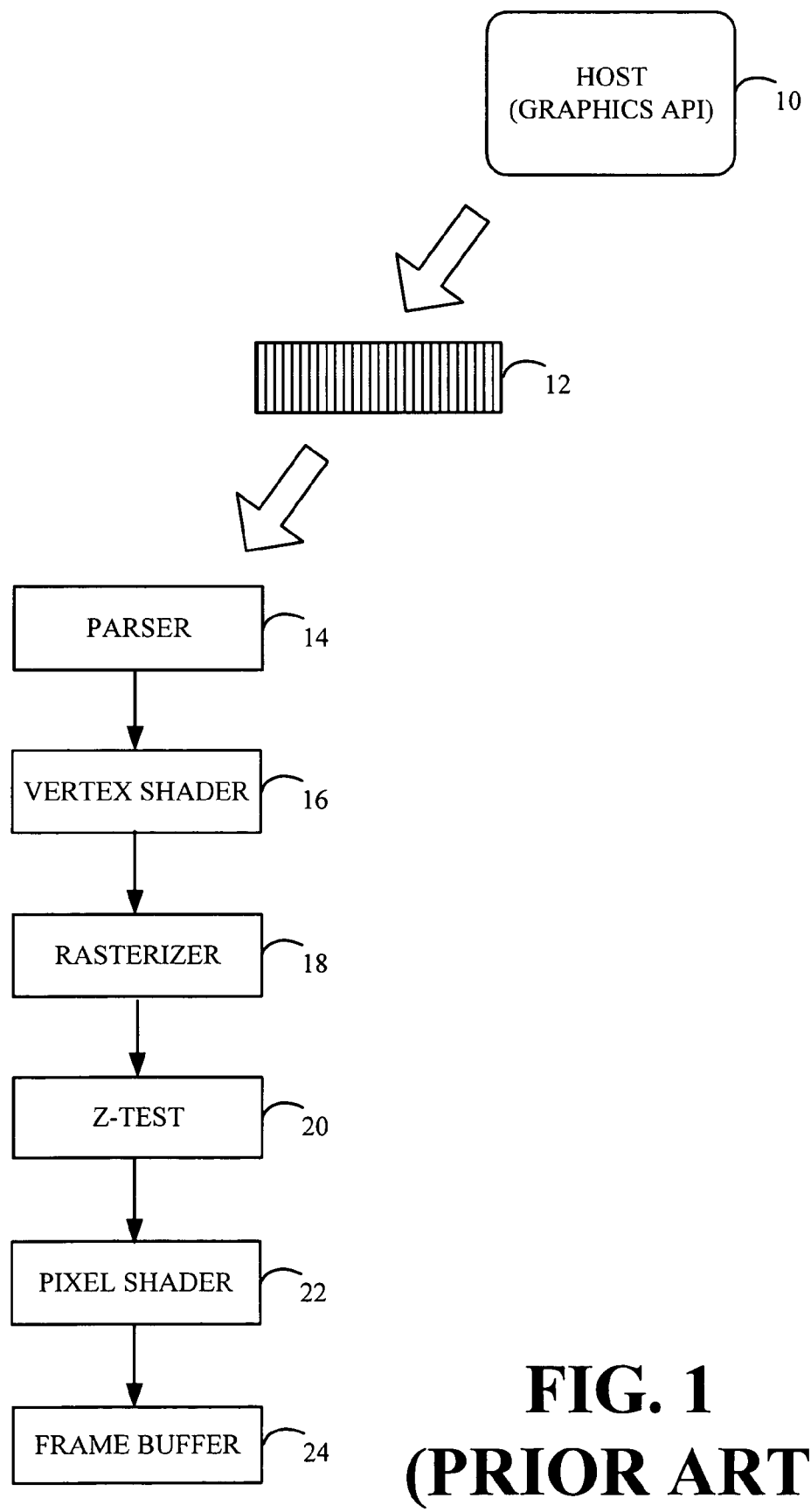
FIG. 1 is a block diagram of a conventional graphics pipeline, as is known in the prior art.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

As will be described further herein, there are several locations in a graphics system where features or aspects of the invention may be implemented. Likewise, it will be appreciated from the description herein that there are systems and environments in fields other than computer graphics where the concepts of the invention may be employed as well.

Figure 2:
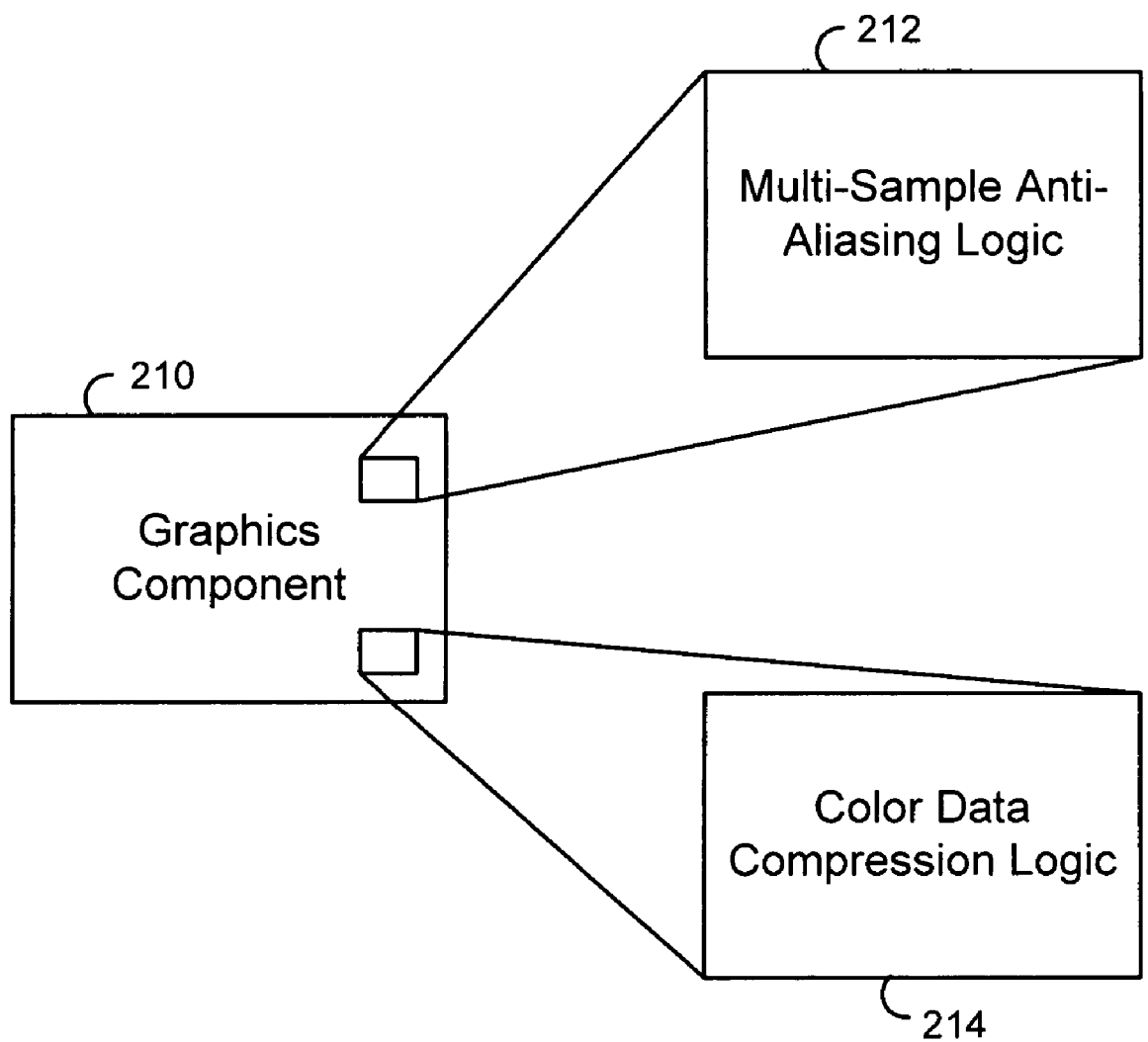
FIG. 2 is a block diagram illustrating a graphics pipeline having elements that are constructed in accordance with an embodiment of the invention.

Reference is made briefly to FIG. 2, which illustrates certain basic components of an embodiment of the invention. FIG. 2 includes a component labeled "Graphics Component" 210, which may designate or represent hardware components in a graphics pipeline. Within this component, logic 212 may be provided for multi-sample anti-aliasing wherein multiple color samples are stored for each pixel within the frame buffer. Likewise, compression logic 214 may be provided for compressing the color data to reduce the traffic between the processor and the frame buffer. This embodiment of the invention may be implemented in systems that provide programmable processing for certain functions, referred to as GPU (Graphic Processing Units), such as the pixel shading, rather than using dedicated hardware for performing this function. In such a system, the reduction of data transmitted between the GPU and the frame buffer using the process described herein greatly improves the efficiency of the programmable GPU processor.

Figure 3:
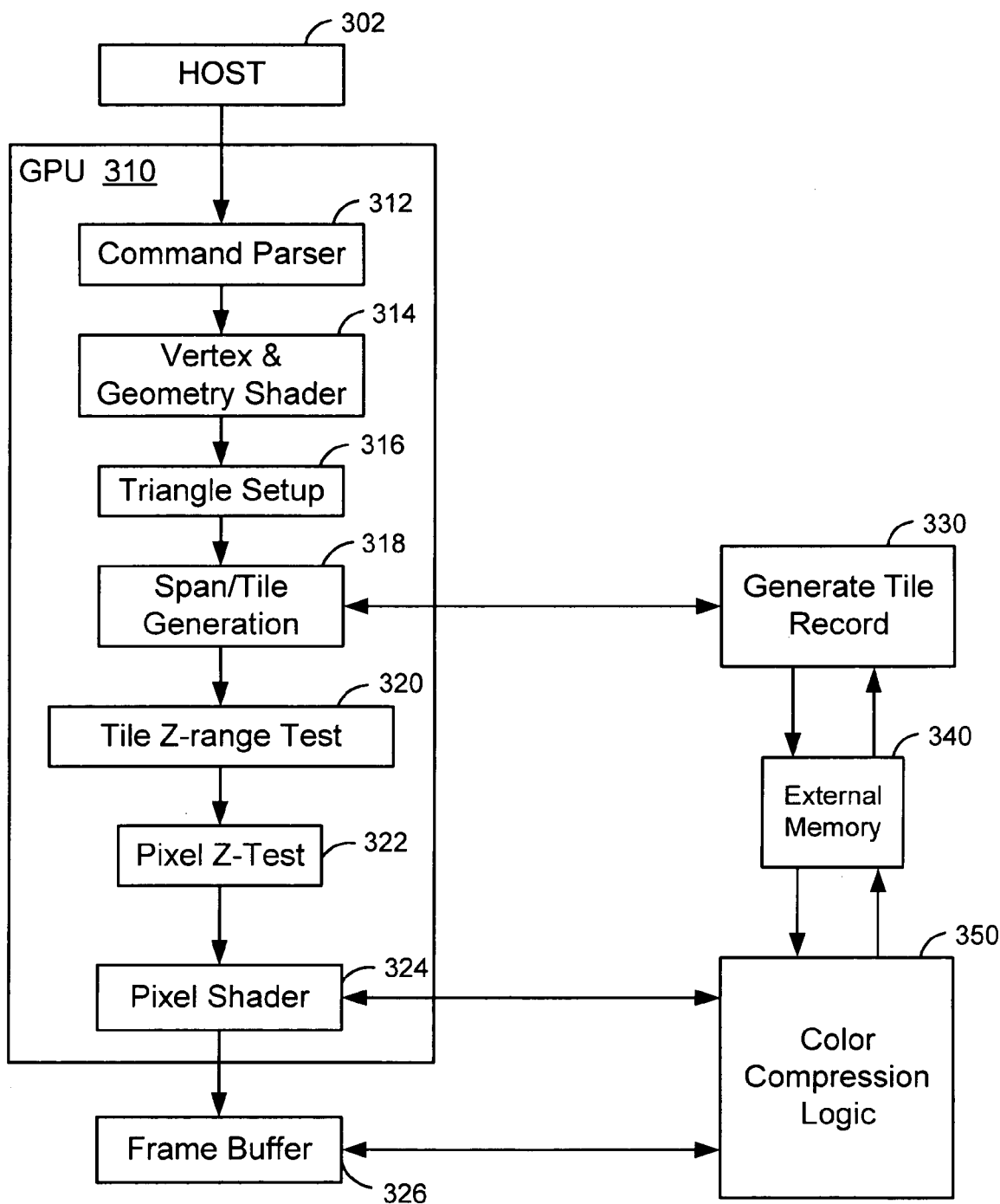
FIG. 3 is a block diagram illustrating certain elements of a graphics component constructed in accordance with one embodiment of the invention.

FIG. 3 illustrates certain of these components in one embodiment of a graphics pipeline implementing color data compression functions. More specifically, FIG. 3 illustrates an embodiment of the present invention in which a graphics pipeline, employing many conventional components, embodies certain inventive features. For example, within the GPU 310, the command parser 312, vertex and geometry shader 314, triangle setup 316, and the span/tile generation 318 are well-known operations, and need not be described herein. Also known is a tile z-range test 320, in which a z-test is performed on compressed z-data. Compressed z-tests performed in this way may improve efficiency by trivially accepting or trivially rejecting certain primitives (or alternatively, ranges of pixels) based upon compressed z-information. A similar, per-pixel, test may be performed by the pixel z-test block 322.

The graphics pipeline of FIG. 3 also illustrates logic for generating a tile record 330 in external memory 340, a pixel shader 324 and logic for performing a color data compression 350. The pixel shader 324 and the tile record generation 330 blocks perform functions that are known in the art, and need not be described herein. As the name implies, the pixel shader 324 performs shading operations on a per-pixel basis. For a given graphic primitive that is being operated upon, or for a given tile in tile-based operations, often a number of the pixels will ultimately not be visible to a user (based on depth information, obstruction by other objects between the current pixel and the view point, etc.). For all such pixels, the pixel shading operation needs not be performed. In a MSAA scheme, the data traffic requirement is greatly increased due to the number of color samples that must be stored for each pixel. Once color information is computed by the pixel shader 324, the information is stored within the frame buffer 326.

The color compression logic 350 reads the tile record from the external memory 340 to perform the compression of the color data in conjunction with the pixel shader 324 to reduce the amount of color data transferred between the GPU 310 and the frame buffer 326.

Figure 4:
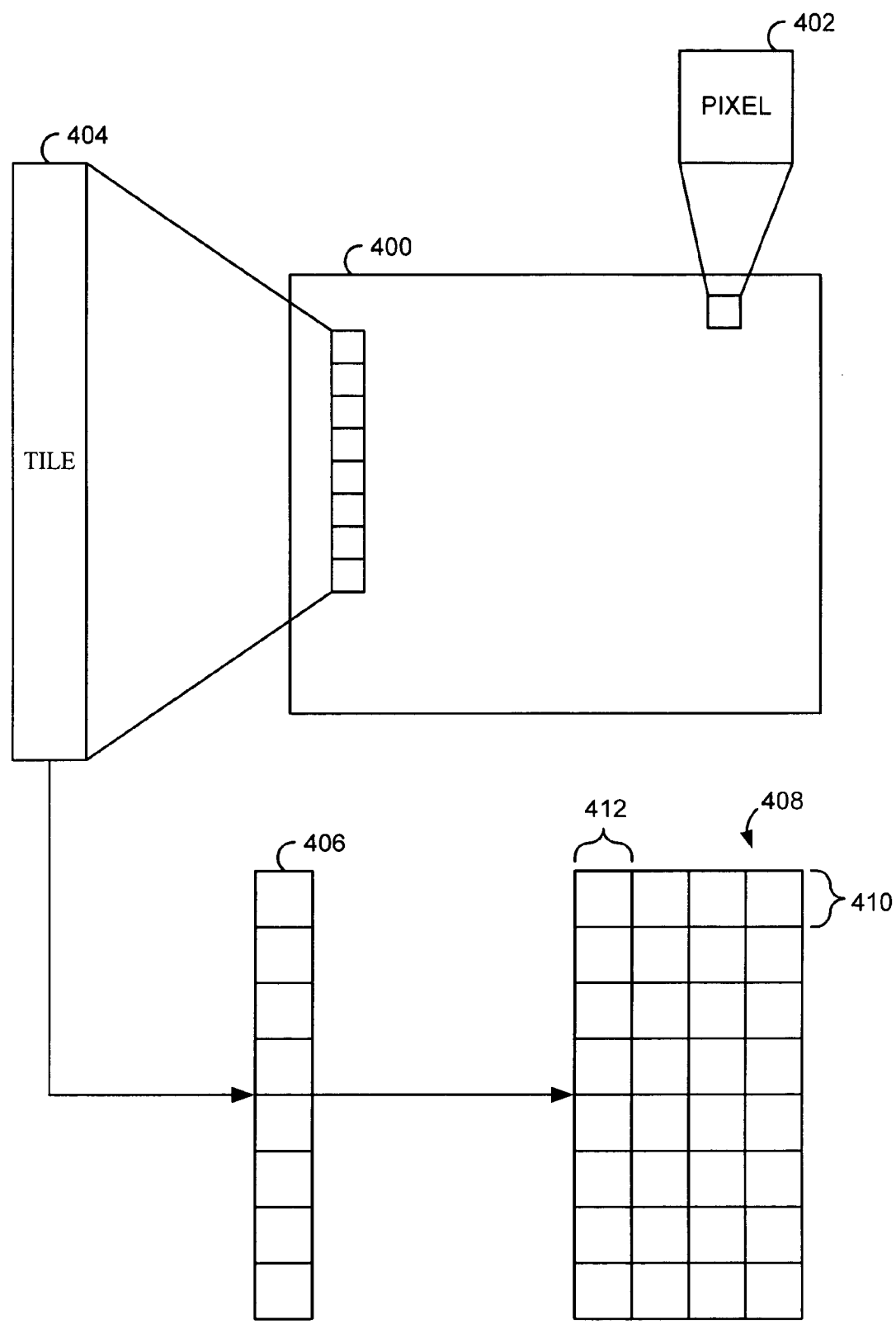
FIG. 4 is a block diagram illustrating an exemplary embodiment of a tile of pixels and pixel color data in a multi-sample anti-aliasing scheme.

Reference is made briefly to FIG. 4, which illustrates an exemplary graphical data organizational scheme of an embodiment of the present invention. Shown first, within the boundaries of a display 400 (FIG. 4), is one of many pixels 402, the fundamental graphical elements on a graphical display. The pixels 402 are organized into dimensionally specific groups known as tiles 404. The tile of this exemplary embodiment contains eight total pixels in an eight vertical pixel by one horizontal pixel configuration 406. One of ordinary skill in the art knows or will know that tiles of different dimensions are consistent with the systems and methods taught herein.

As discussed above, in a computer graphics system, there may be a significant amount of graphics data associated with each pixel 402. This graphics data may include color information, such as red, green, blue, and alpha (R,G,B,A), depth information (Z), texture information (U and V coordinates), etc. Within the context of the MSAA methods, the color information alone may represent a significant amount of data, especially as sampling rates increase. For example, a computer graphics system utilizing MSAA methods with a sampling rate of four would store four different color samples for each pixel. Thus, the color sample data associated with the tile 406 will have thirty-two color samples as shown in the array 408. The array 408 depicts four samples per row 410 corresponding with each pixel in the tile 406. The array 408 has columns 412 corresponding to the same color sample in each pixel.

Figure 5:
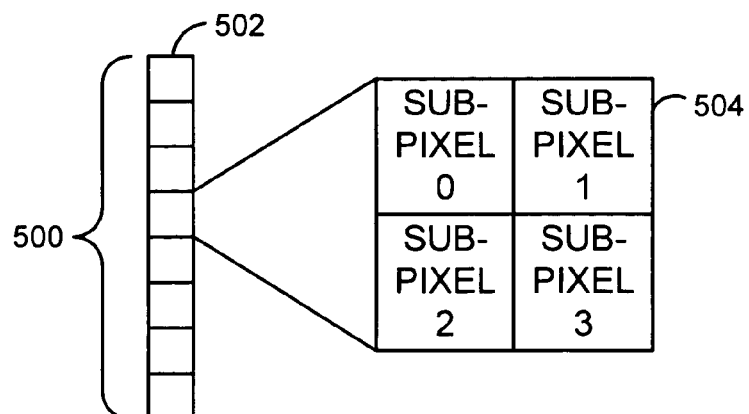
FIG. 5 is a block diagram of an embodiment of sub-pixel data in an exemplary tile.

Reference is now made to FIG. 5, which illustrates a block diagram of an embodiment of sub-pixel data in an exemplary tile. Consistent with the above example, a tile 500 consisting of eight pixels 502 is shown in an exemplary eight vertical pixel by one horizontal pixel configuration. The color data for each pixel 502 is further defined in multiple sub-pixels 504, which each contain a color sample for the pixel. This exemplary configuration features four sub-pixels per pixel as determined by a sampling rate of four. For example, in a system with a sampling rate of sixteen, the color data for each pixel would be defined by sixteen sub-pixels or color samples. Under the systems disclosed herein, the color data for each sub-pixel 504 is stored using multiple planes.

Figure 6:
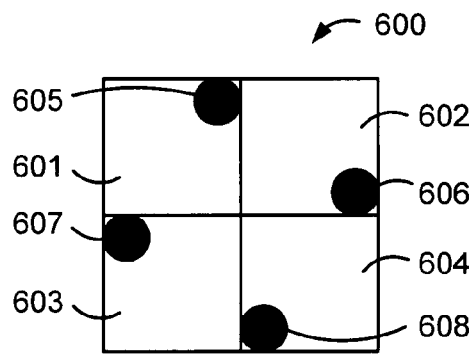
FIG. 6 is a block diagram illustrating an exemplary MSAA pixel in an embodiment of the methods herein.

Reference is now made to FIG. 6, which illustrates a block diagram of an exemplary MSAA pixel under the methods herein. The pixel 600 contains four sub-pixels 601–604 of color data, consistent with a sampling rate of four. The sub-pixels 601–604 contain color data samples 605–608, respectively. Note that the color data samples 605–608 are configured to represent the color at different and specific points within the pixel 600. For example, depending on the number and configuration of sub-pixels, the locations of the color data samples 605–608 may be different within each sub-pixel such that the pixel is represented by the color data samples in a thorough and effective manner. Each of the color data samples is stored in a different plane such that, for example, the color data sample 605 in the top left sub-pixel 601 is stored in plane zero. A plane assignment in accordance with this example is depicted in the following table:

| Color Data Sample | Plane |
|---|---|
| Top Left (605) | 0 |
| Top Right (606) | 1 |
| Bottom Left (607) | 2 |
| Bottom Right (608) | 3 |

The planes are associated with the color data samples in each pixel in the tile. Specifically, each sub-pixel is assigned to a default plane, also referred to as the designated plane. For example, all of the top left color data samples 605 for each pixel in a tile are assigned to plane 0 and stored in a contiguous block of memory in the frame buffer. Similarly, all of the top right color data samples 606 for each pixel in a tile are assigned to plane 1 and stored in another contiguous block of memory in the frame buffer.

Figure 7:
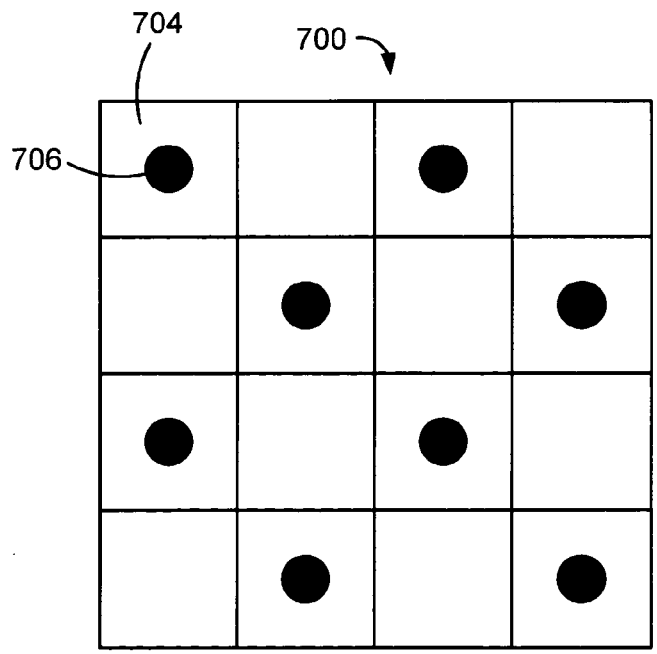
FIG. 7 is a block diagram illustrating an alternative exemplary MSAA pixel in an embodiment of the methods herein.

Reference is briefly made to FIG. 7, a block diagram of an embodiment of an exemplary MSAA pixel under the methods herein. The pixel 700 contains eight sub-pixels 704 of color data, consistent with a sampling rate of eight. The sub-pixels 704 contain color data samples 706. Note that the color data samples 706 are configured to represent the color at different and specific points within the pixel 700. Also, note that the eight color data samples 706 provide significantly greater potential for increased color resolution than the four color data samples 605–608 of the FIG. 6. Each of the color data samples 706 is stored in a different plane such that, for example, the color data samples 706 are stored in planes zero through seven. Like the pixel of FIG. 6, each of the planes is associated with a specific color data sample in all of the pixels in the tile. Specifically, the color data samples for each specific sub-pixel in all pixels of a tile are assigned to a particular plane, which is stored in a contiguous block of memory in the frame buffer.

Figure 8:
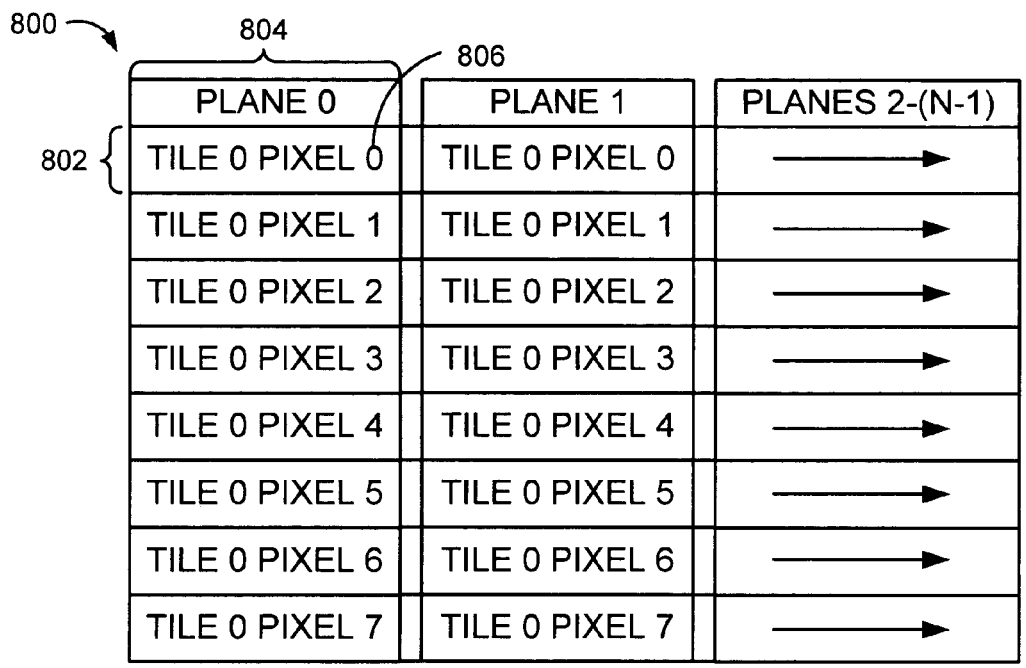
FIG. 8 is a block diagram illustrating an embodiment of a frame buffer memory layout corresponding to multiple planes in an MSAA scheme.

Reference is now made to FIG. 8, which illustrates a block diagram of an embodiment of a frame buffer memory layout corresponding to multiple planes in an MSAA scheme. Continuing with the exemplary eight pixel tile configuration discussed above, a layout of the frame buffer memory 800 is shown for an implementation of a MSAA system having a sampling rate of "N". The frame buffer memory layout 800 features individual memory blocks of color data samples 806 organized into multiple planes 804. The color data samples for each pixel in the tile are organized, for example, in a row of samples 802 corresponding to the "N" planes for the specific pixel. Further, each of the planes 804 is organized, for example, in a column. The color sample data of each plane 804 in the tile is stored in a contiguous memory block. Additionally, the memory blocks between planes may be contiguous memory depending on the specific implementation. As shown, the storage of multiple color data samples for each pixel results in an increasingly large amount of data, especially at higher sampling rates.

Figure 9:
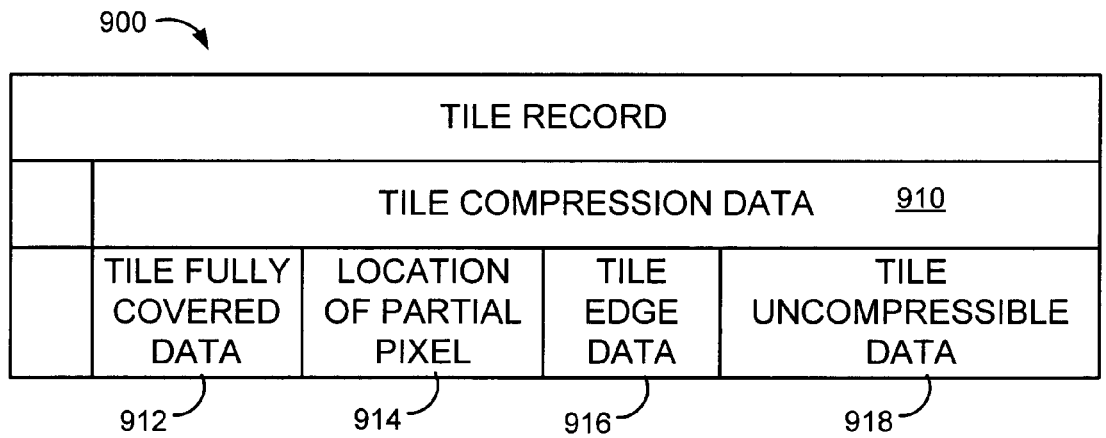
FIG. 9 is a block diagram illustrating an exemplary tile record format of an embodiment of the systems and methods herein.

Reference is now made to FIG. 9, which is a block diagram illustrating an exemplary tile record format of an embodiment. The tile record 900 is stored in external memory and includes tile compression data 910. The tile compression data 910 includes a field indicating if the tile is fully covered 912 by a primitive. The case where all of the pixels in a tile are fully covered represents the highest level of color data compression because the compression does not require a memory read except for the compression data in the tile record. For example, the color data for all pixels in the tile can be stored in plane 0 because all pixels in the tile require only one plane of color data samples.

The tile compression data also includes the location of any partially covered pixels in the tile 914. A partially covered pixel occurs where one of the pixels in the tile contains an edge between two primitives but no other pixels are fully covered by another primitive. In this case, the compression may be optimized to determine the conditions under which the color data can be compressed. An effective optimization is possible in the case where the chance of a memory read is low, especially when the sampling rate is large. This circumstance may be determined, for example, by what portion of the pixel is covered compared to a predetermined optimization value for partially covered pixels.

Figure 10:
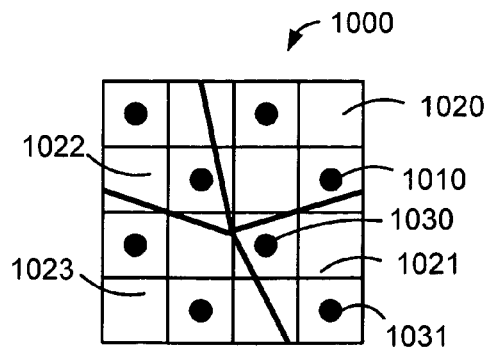
FIG. 10 is a simplified diagram, which illustrates exemplary pixels with different levels of partial coverage by a primitive utilized in an embodiment of the systems and methods herein.

Referring briefly to FIG. 10, which illustrates an exemplary pixel with partial coverage by four primitives. The pixel 1000 of FIG. 10, for example, depicts the sub-pixel samples 1010 in a system utilizing a sampling rate of eight. The pixel 1000 represents the only partially covered pixel in the tile (not shown). The eight sub-pixels 1010 are divided by four primitives 1020–1023 where each primitive owns two sub-pixels. For example, primitive 1021 owns sub-pixels 1030–1031. An exemplary optimization may be configured such that while other pixels can be stored in plane 0, the sub-pixels of this pixel can be stored in plane 1. In this case, plane 1 can store all of the sub-pixel samples 1010 of the partially covered pixel 1000 since plane 1 can store eight colors.

Referring again to FIG. 9, the tile record 900 also contains tile edge data 916 for a tile having an edge. Since most tiles will only have one edge if they are not fully covered, optimization for this case represents an opportunity for effective utilization of the compression methods herein. A minimum storage requirement of edge data in the compression code will indicate the edge pattern number and a corresponding lookup table for accessing the actual edge function. The edge function will be used to determine where each sub-pixel is located relative to the edge in each of the partially covered pixels. Since the sub-pixels within the tile are located on different sides of the edge, the color will need to be stored in plane 0 and plane 1. One of ordinary skill in the art knows or will know that storing the color data in just two planes results in a significant traffic savings in systems with sampling rates greater than two.

The tile record 900 further includes tile uncompressible data 918, for indicating when the tile is not suitable for color data compression. This field serves to indicate if a tile configuration is such that optimization associated with color data compression does not result in traffic savings.

Reference is now made to FIG. 11, which illustrates a fully covered tile that may be utilized in embodiments of the present invention. It should be appreciated that the illustration of FIGS. 11A–11D are significantly simplified to facilitate the illustration of certain aspects of embodiments of the invention. However, the simplified illustration provided herein is sufficient for persons skilled in the art to implement more complex and realistic examples.

Figure 11A:
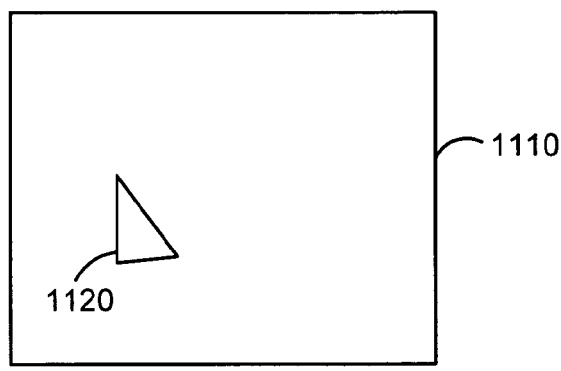
FIG. 11 is a simplified illustration of a fully covered tile utilized in an embodiment of the systems and methods herein.
Figure 11B:
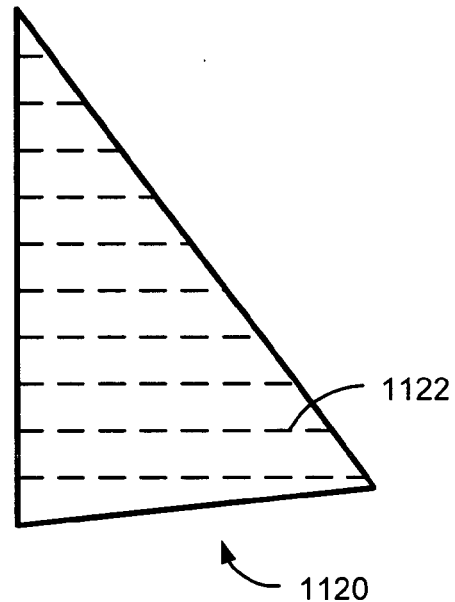
Figure 11C:
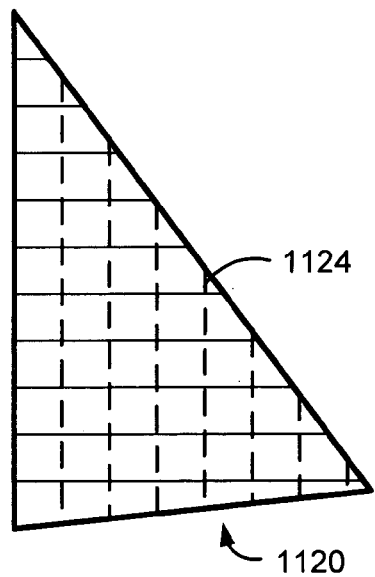
Figure 11D:
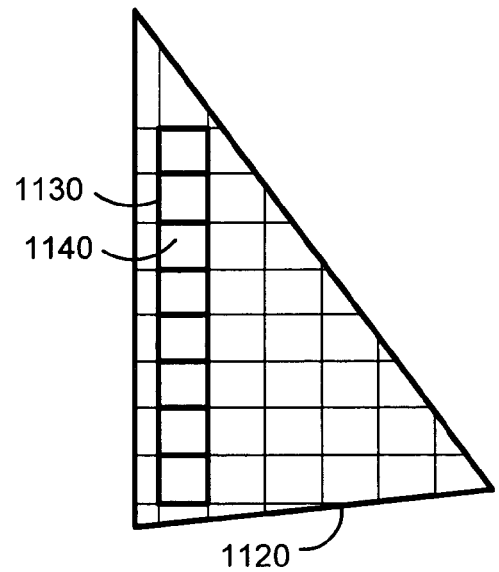

Referring first to FIG. 11A, a triangle primitive 1120 is shown within the boundaries of a display 1110. As is well known, a computer graphics display will often render hundreds of thousands of primitives in a single graphics display. Primitives are frequently broken down to triangle primitives, such as triangle 1120. As is known, early (front-end) components in a graphics pipeline perform certain setup and vertex-based operations on the primitives. Span and tiled generation components will break a primitive up into scan lines 1122 (FIG. 11B) and pixels 1140 (FIG. 11D) defined by vertical lines 1124 (FIG. 11C) crossing the scan lines 1122. Pixels 1140 are often grouped into tiles of 2×2, 4×4, 8×8, or other sized dimensions. FIG. 11D illustrates a tile 1130 having a dimension of 1×8 pixels. The alignment of tile 1130 is arbitrarily illustrated with reference to the triangle primitive 1120. The location of the tile 1130 relative to the triangle primitive 1120 represents the best case for compression because the tile 1130 is fully covered by the triangle primitive 1120. As discussed above, the color data for the fully covered tile 1130 is stored in only one plane, namely plane 0.

Figure 12A:
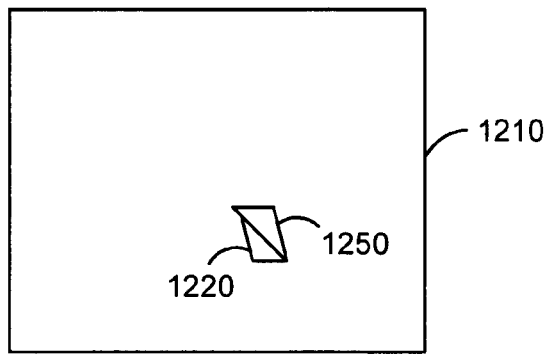
FIG. 12 is a simplified illustration of a partially covered tile utilized in an embodiment of the systems and methods herein.
Figure 12B:
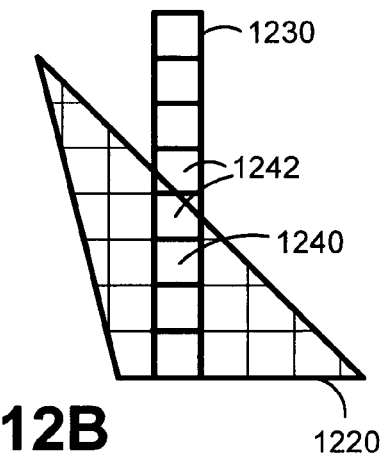
Figure 12C:
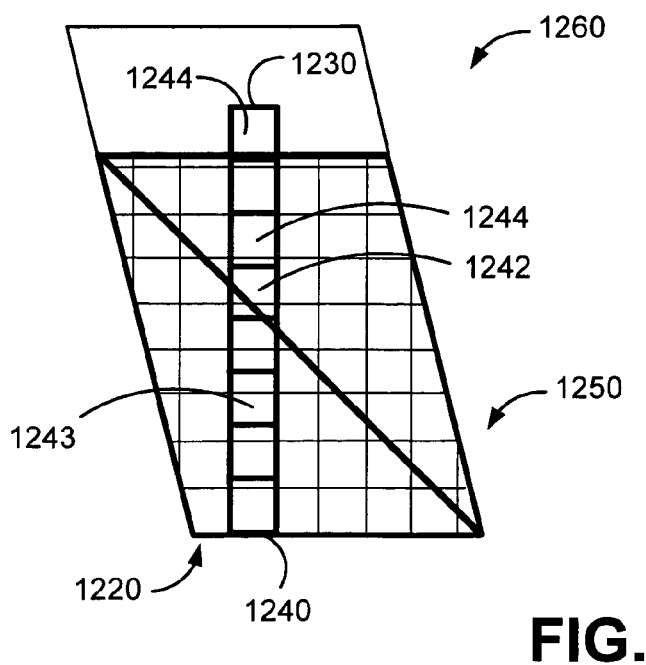

Reference is now made to FIGS. 12A–12C, which illustrate a partially covered tile that may be utilized in embodiments of the present invention. It should be appreciated that the illustration of FIGS. 12A–12C are significantly simplified to facilitate the illustration of certain aspects of embodiments of the invention. However, the simplified illustration provided herein is sufficient for persons skilled in the art to implement more complex and realistic examples.

Referring first to FIG. 12A, adjacent triangle primitives 1220 and 1250 are shown within the boundaries of a display 1210. As is well known, a computer graphics display will often render hundreds of thousands of primitives in a single graphics display. Primitives are frequently broken down to triangle primitives, such as triangles 1220 and 1250. As discussed in reference to FIG. 11, span and tiled generation components will break a primitive up into pixels 1240 (shown in FIG. 12B) defined by vertical lines crossing scan lines. Pixels 1240 are often grouped into tiles of 2×2, 4×4, 8×8, or other sized dimensions. FIG. 12B illustrates a tile 1230 having a dimension of 1×8 pixels. The alignment of tile 1230 is arbitrarily illustrated with reference to the triangle primitive 1220. Unlike the case of a fully covered tile as illustrated in FIG. 11, the tile 1230, as shown in FIG. 12C is partially covered by the primitive 1220 and partially covered by the primitive 1250. Optimized color compression in this case will require storing the color data in two planes, specifically planes 0 and 1. The compression code in the tile record will include the edge data for resolving the partially covered pixels 1242 and the color data for the fully covered pixels 1243 and 1244 covered by primitives 1220 and 1250 respectively. Although the cost of the optimization is not insignificant, the savings in memory traffic still justifies performing the color compression, especially as the sampling rate increases.

Figure 13A:
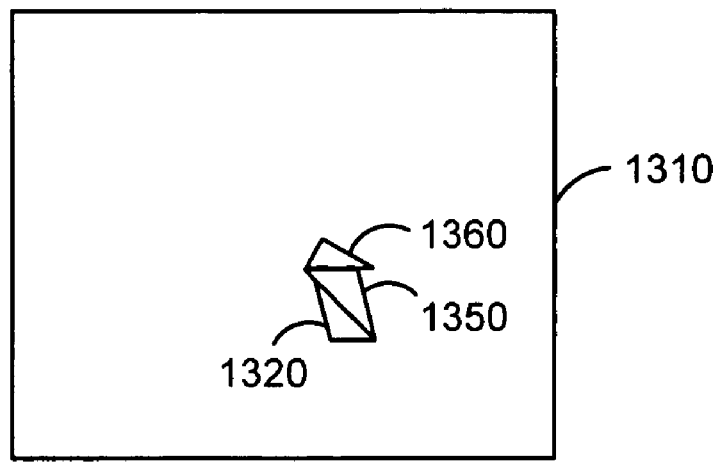
FIG. 13 is a simplified illustration of a tile covered by more than two primitives as utilized in an embodiment of the systems and methods herein.
Figure 13B:
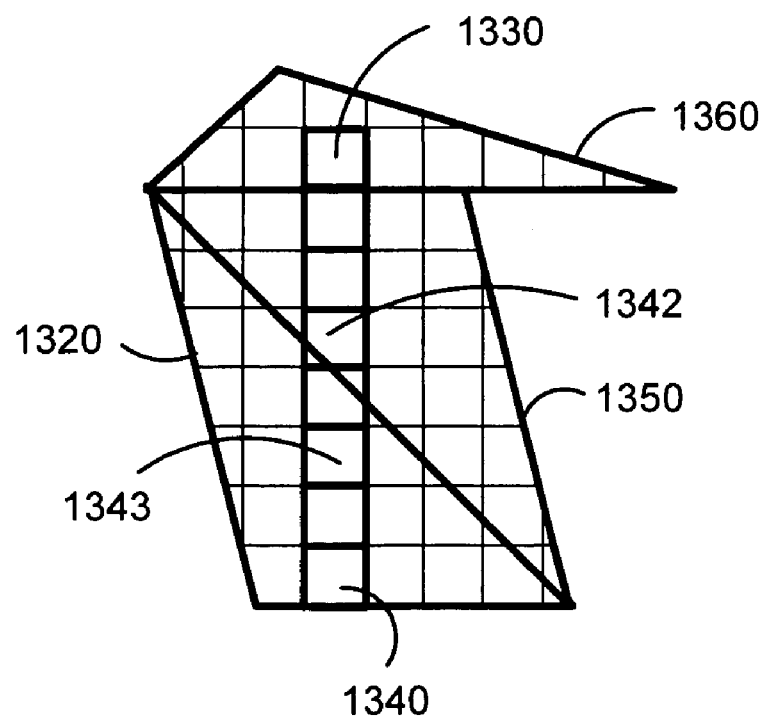

Reference is now made to FIGS. 13A and 13B, which illustrate a tile, partially covered by three primitives, that may be utilized in embodiments of the present invention. It should be appreciated that the illustration of FIGS. 13A and 13B are significantly simplified to facilitate the illustration of certain aspects of embodiments of the invention. However, the simplified illustration provided herein is sufficient for persons skilled in the art to implement more complex and realistic examples.

Referring first to FIG. 13A, adjacent triangle primitives 1320, 1350 and 1360 are shown within the boundaries of a display 1310. As is well known, a computer graphics display will often render hundreds of thousands of primitives in a single graphics display. Primitives are frequently broken down to triangle primitives, such as triangles 1320, 1350 and 1360. As discussed in reference to FIG. 11, span and tiled generation components will break a primitive up into pixels 1340 (FIG. 13B) defined by vertical lines crossing scan lines. Pixels 1340 are often grouped into tiles of 2×2, 4×4, 8×8, or other sized dimensions. FIG. 13B illustrates a tile 1330 having a dimension of 1×8 pixels. The alignment of tile 1330 is arbitrarily illustrated with reference to the triangle primitives 1320, 1350 and 1360. Unlike the case of a fully covered tile as illustrated in FIG. 11 and the tile having only one edge as shown in FIG. 12, the tile 1330, as shown in FIG. 13B is partially covered by the primitives 1320, 1350 and 1360. Optimized color compression in this case will require storing the color data in three planes and, at some sampling rates, may be determined to result in no memory traffic savings. In some cases, the compression code in the tile record will not be configured to include the edge data for resolving the color data for more than one edge in the tile. In such a case, the tile record will indicate that the tile is uncompressible and all of the multiple samples of color data for the pixels will be stored in the frame buffer.

In some implementations an optimization of the color compression will support the compression of color data for a tile covered by more than two primitives. For example, in a system having higher sampling rate, the cost of the optimization, although high, may still be justified due to a savings in memory traffic.

Figure 14:
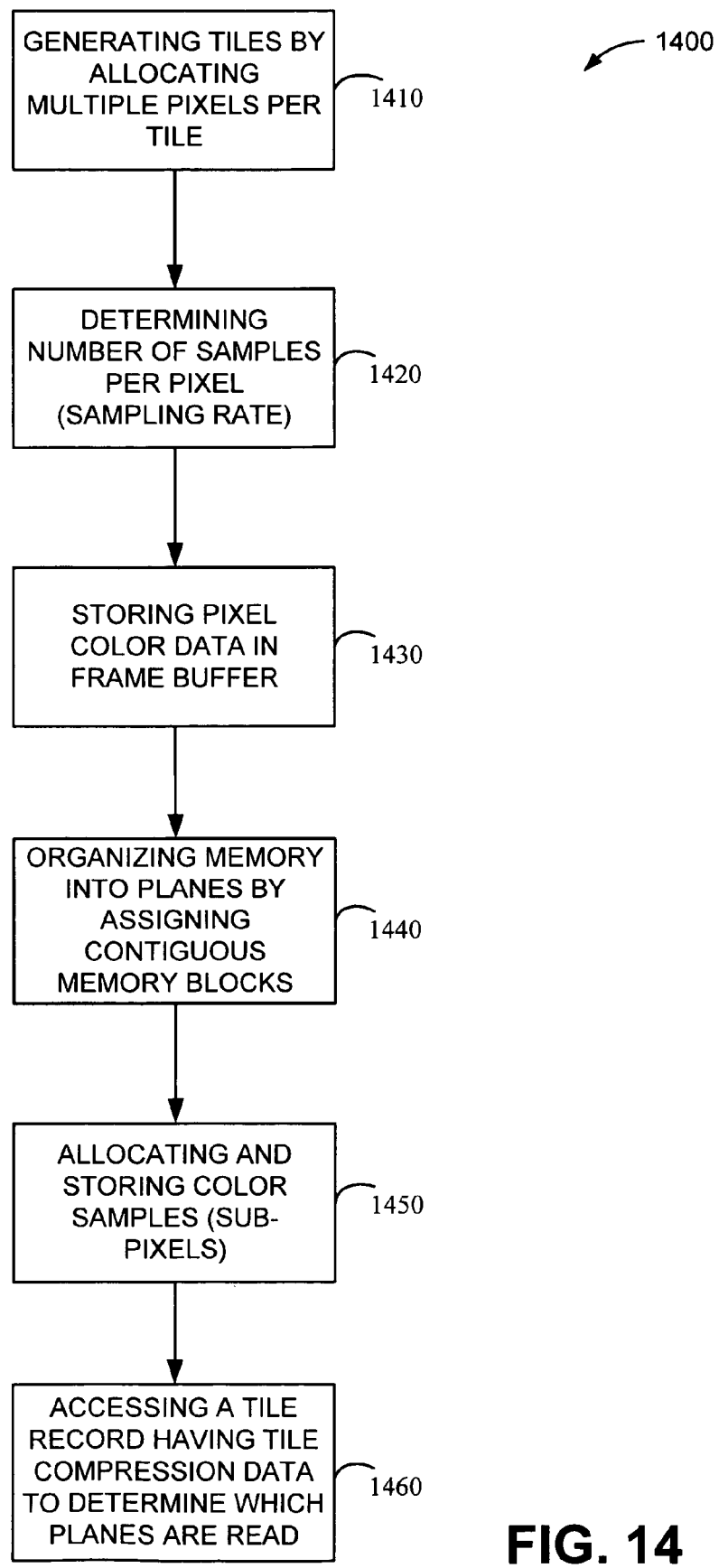
FIG. 14 is a block diagram illustrating a method of compressing color data in an embodiment disclosed herein.

Reference is now made to FIG. 14, which is a block diagram illustrating a method of compressing color data in an embodiment disclosed herein. The method 1400 generates tiles by allocating multiple pixels per tile 1410. The tiles are groups of pixels having specific dimensional configurations such as 2×2, 4×4, 8×8, or, as in the above examples, 1×8 pixels. Based on, for example, the system capacity and the graphics resolution requirements, the number of color data samples per pixel is determined 1420. This figure is referred to as the sampling rate in an MSAA scheme. The pixel color data is stored in the frame buffer for possible reading by the GPU 1430. To the extent the reading and storage of color data is unnecessary due to the color compression methods herein, system memory traffic is reduced.

The frame buffer memory is organized into planes by assigning contiguous blocks of memory for each subtile for all of the pixels in the tile 1440. Specifically, each plane in the tile corresponds to a particular sub-pixel in each pixel of the tile. The color samples associated with each of the sub-pixels are allocated and stored 1450. A tile record is accessed from memory external to the GPU and tile compression data is read to determine which of the multiple planes are to be read 1460. Reading the separate tile record including the tile compression data requires very little read traffic and the resulting decrease in traffic corresponding to the compression of the color data using the multiple planes creates a significant savings in memory traffic.

Figure 15:
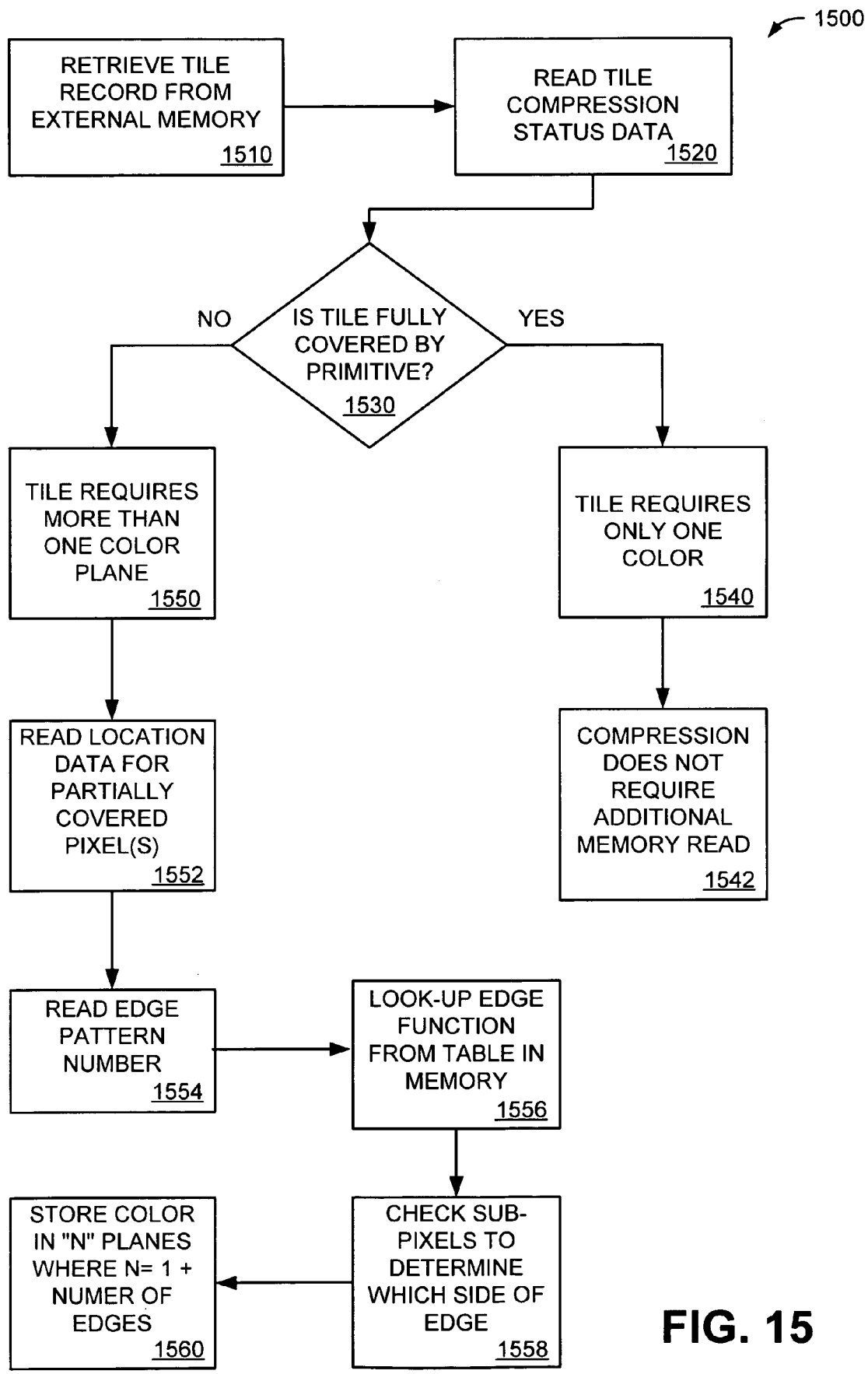
FIG. 15 is a block diagram illustrating an exemplary embodiment of a method of using a tile record in a multiple plane implementation.

Reference is now made to FIG. 15, which is a block diagram illustrating a method of compressing color data in an embodiment disclosed herein. Under the method 1500, the tile record is retrieved from external memory 1510. As discussed above, the traffic from reading the tile record is insignificant compared to the reduction in memory traffic corresponding to the memory traffic savings realized from the compression of the color data. Within the tile record, the tile compression status data is read 1520. The tile compression status data indicates, in part, whether the tile is fully covered by a primitive 1530. If the tile is fully covered by a primitive then the tile only requires one color 1540, wherein the color data is stored only in one of the multiple planes allocated for color data samples in an MSAA system. In this circumstance, the compression does not require an additional memory read 1542 and a large quantity of memory traffic is saved.

If the tile is not fully covered then the tile requires more than one color plane 1550. The location data for partially covered pixels is read 1552 and the edge pattern number is read 1554. The corresponding edge function is looked up in a table based on the edge pattern number 1556 and sub-pixels in partially covered pixels are checked to determine which side of the edge they are on 1558. The color data is stored in the required number of planes based on the number of samples required under the compression scheme 1560. Specifically, the color compression requires "N" planes to store the color data where "N" is the number of edges intersecting the tile plus one.

The embodiments of the present invention can be implemented in hardware, software, firmware, or a combination thereof. In some embodiments, the compression of color data is implemented in software or firmware that is stored in a memory and that is executed by a suitable instruction execution system. If implemented in hardware, as in an alternative embodiment, the compression of color data can be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A system for compressing color data in a computer graphics system, comprising:
    a graphics processing unit (GPU);
    a frame buffer, in communication with the GPU, adapted to maintain color data for a pixel;
    a plurality of sub-pixels, such that each of the plurality of sub-pixels comprises a color sample for the pixel;
    a sampling rate, wherein the sampling rate comprises the number of sub-pixels per pixel and wherein the sampling rate is predetermined;
    a tile, wherein the tile comprises a plurality of pixels; and
    a plurality of planes adapted to store the plurality of color samples, wherein a sampling rate equals the number of planes, and wherein each of the plurality of planes comprises a contiguous block of memory for a tile and each of the plurality of planes stores the color sample for a specific one of the plurality of sub-pixels such that each of the plurality of sub-pixels corresponds to a designated plane.

2. The system of claim 1, further comprising a tile record, wherein the tile record comprises compression status data, the compression status data comprising a fully covered tile bit configured to indicate that the tile is fully covered, wherein the tile is fully covered if all pixels in the tile are fully covered; and location data of a partially covered pixel.

3. The system of claim 2, wherein the compression status data further comprises tile edge data.

4. The system of claim 3, wherein the tile edge data comprises:
    the location of an edge;
    an edge pattern number; and
    an edge function lookup table, wherein an edge function can be accessed using the edge pattern number.

5. The system of claim 2, wherein the compression status data comprises a non-compressible tile bit, configured to indicate the suitability of the tile for color data compression.

6. A method of compressing color data in a computer graphics system, comprising the steps of:
    storing pixel color data in a frame buffer;
    establishing a sampling rate, for determining the number of color samples per pixel;
    allocating a plurality of color samples to each pixel, wherein each of the plurality of color samples comprises a sub-pixel, such that each pixel comprises a plurality of sub-pixels;
    generating a tile, such that the tile comprises a plurality of pixels;
    organizing memory into a plurality of planes adapted to store the plurality of sub-pixels, wherein each of the plurality of sub-pixels associated with the pixel comprises a different one of the plurality of planes, and wherein each of the plurality of planes comprises contiguous memory; and
    accessing a tile record, such that the tile record comprises tile compression data.

7. The method of claim 6, wherein the tile compression data comprises tile fully covered data, to indicate if all pixels in a tile are fully covered.

8. The method of claim 7, wherein if the tile is fully covered, a tile color comprises one of the plurality of color samples in one of the plurality of pixels.

9. The method of claim 6, wherein the tile compression data comprises tile edge data.

10. The method of claim 9, wherein the tile edge data comprises:
    edge location data configured to define which pixel in the tile contains an edge;
    an edge pattern number, and
    an edge function lookup table for determining an edge function.

11. The method of claim 10, further comprising the step of testing the plurality of sub-pixels to determine the location of each of the plurality of sub-pixels relative to the edge.

12. The method of claim 6, wherein the tile compression data comprises tile not compressible data.

13. Computer graphics hardware, comprising a means for compressing color data using a plurality of designated planes to store sub-pixel color sample data, wherein each of the plurality of planes stores a color sample for a specific one of a plurality of sub-pixels such that each of the plurality of sub-pixels corresponds to a designated plane and wherein each of the plurality of designated planes comprises a block of contiguous memory, and means for organizing a plurality of pixels into a tile, wherein the tile corresponds to a tile record stored in a computer memory, and wherein the tile record comprises tile compression data.

14. The computer hardware of claim 13, further comprising a means for determining which of the plurality of designated planes store color data for the tile, wherein the tile compression data comprises tile fully covered data to indicate that the plurality of pixels in the tile are all covered, and wherein if the tile is fully covered the sub-pixel color sample data for the plurality of pixels in the tile comprise one of the plurality of designated planes.

15. A computer graphics system comprising:
multi-sample anti-aliasing logic configured to store a plurality of color samples for each pixel, wherein each color sample comprises a sub-pixel, such that the color data for each pixel comprises a plurality of sub-pixels, and wherein a tile comprises a plurality of pixels;
color data compression logic configured to designate a plurality of planes, wherein each of the plurality of planes is designated for a different one of the plurality of sub-pixels, and wherein the each of the plurality of planes comprises a block of contiguous memory; and
tile compression status logic configured to determine the compressibility of a tile, wherein a tile record comprises tile fully covered data to indicate when all pixels in the tile are fully covered, wherein if the tile is fully covered tile color data is stored in a first plane of the plurality of planes.

16. The computer graphics system of claim 15, wherein the tile record further comprises tile edge data, wherein if the tile contains a first edge the tile color data is stored in a first plane and a second plane of the plurality of planes.

17. The computer graphics system of claim 16, wherein the tile edge data comprises:.
a location of the edge;
an edge pattern number; and
an edge function table, wherein an edge function can be accessed by referencing a the edge pattern number.

18. The computer graphics system of claim 16, wherein if the tile edge data indicates "n" edges in the tile, the tile color data is stored in "n+1" planes.

19. A system for compressing color data in a computer graphics system, comprising:
a computer graphics display;
a plurality of pixels for rendering an image in the computer graphics display;
a plurality of sub-pixels within each of the plurality of pixels, wherein each of the plurality of sub-pixels stores color sample data; and
a plurality of planes for storing the color sample data, wherein each of the plurality of planes comprises a contiguous block of memory for a tile comprising at least one pixel and each of the plurality of planes stores the color sample for a specific one of the plurality of sub-pixels such that each of the plurality of sub-pixels corresponds to a designated plane.

* * * * *